(12) United States Patent
Namoun

(10) Patent No.: US 10,508,934 B2
(45) Date of Patent: Dec. 17, 2019

(54) TRANSMISSION OF INFORMATION AND ENERGY BETWEEN A MOBILE SENSOR AND A STATIONARY ELEMENT

(71) Applicant: BIA, Conflans Sainte Honorine (FR)

(72) Inventor: Fayçal Namoun, Courbevoie (FR)

(73) Assignee: BIA, Conflans Sainte Honorine (FR)

( * ) Notice: Subject to any disclaimer, the term of this patent is extended or adjusted under 35 U.S.C. 154(b) by 0 days.

(21) Appl. No.: 15/737,106

(22) PCT Filed: Jun. 17, 2016

(86) PCT No.: PCT/EP2016/064095
§ 371 (c)(1),
(2) Date: Dec. 15, 2017

(87) PCT Pub. No.: WO2016/203026
PCT Pub. Date: Dec. 22, 2016

(65) Prior Publication Data
US 2018/0172482 A1    Jun. 21, 2018

(30) Foreign Application Priority Data
Jun. 17, 2015 (FR) .................................. 15 55537

(51) Int. Cl.
*G01D 5/26* (2006.01)
*H04B 10/114* (2013.01)

(52) U.S. Cl.
CPC ......... *G01D 5/264* (2013.01); *H04B 10/1143* (2013.01)

(58) Field of Classification Search
CPC ........ G01D 5/264; G01D 21/00; G01D 5/268; H04B 10/1143
USPC .......................................... 73/886.1
See application file for complete search history.

(56) References Cited

U.S. PATENT DOCUMENTS

| 5,119,679 A | 6/1992 | Frisch | |
|---|---|---|---|
| 5,399,875 A * | 3/1995 | Crowne | G01F 23/0061 250/577 |
| 2008/0221825 A1 * | 9/2008 | Nyffenegger | G01D 5/2515 702/122 |
| 2008/0237471 A1 * | 10/2008 | Sanpitak | A61B 5/0002 250/363.1 |

FOREIGN PATENT DOCUMENTS

| CA | 2 574 780 A1 | 8/2008 |
|---|---|---|
| EP | 0 324 349 A2 | 7/1989 |

* cited by examiner

*Primary Examiner* — Nathaniel T Woodward
(74) *Attorney, Agent, or Firm* — Baker & Hostetler LLP

(57) ABSTRACT

A device comprises a fixed element, a mobile element, a physical measurement sensor secured to the mobile element and a link allowing a transmission of information between the sensor and the fixed element, the sensor generating a primary signal representative of the physical measurement. The device further comprises a converter of the primary signal into a light signal. The converter is secured to the mobile element. The link is an optical path. The light signal is propagated freely between the fixed element and the mobile element along the optical path. The sensor comprises a power supply module receiving energy from the fixed element without contact.

10 Claims, 2 Drawing Sheets

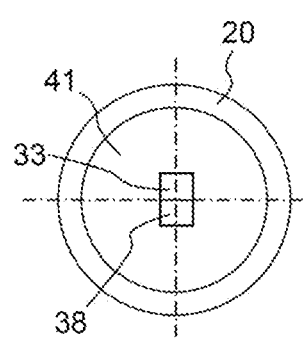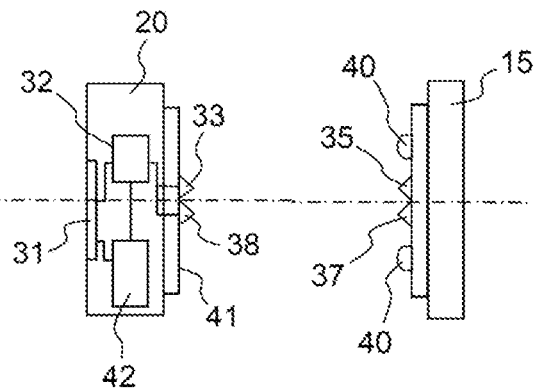
FIG.2a  FIG.2b
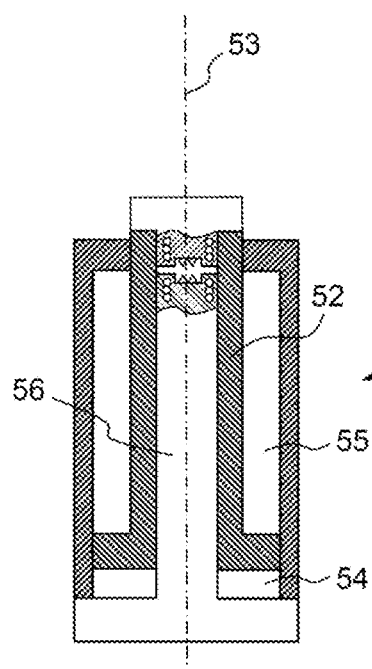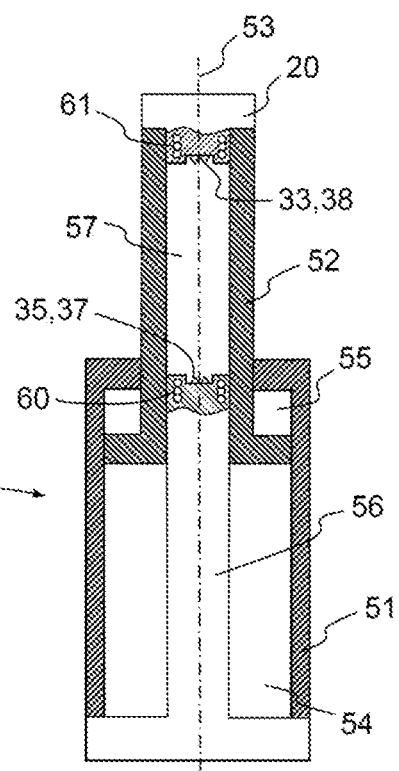
FIG.3a  FIG.3b

TRANSMISSION OF INFORMATION AND ENERGY BETWEEN A MOBILE SENSOR AND A STATIONARY ELEMENT

CROSS-REFERENCE TO RELATED APPLICATIONS

This application is a National Stage of International patent application PCT/EP2016/064095, filed on Jun. 17, 2016, which claims priority to foreign French patent application No. FR 1555537, filed on Jun. 17, 2015, the disclosures of which are incorporated by reference in their entirety.

FIELD OF THE INVENTION

The invention relates to a device having several elements that can be moved relative to one another. One of the elements is considered to be fixed, that is to say an element forming a reference base. This reference base can itself also be mobile, like the chassis of a vehicle for example. This vehicle can comprise, for example, articulated arms forming elements that are mobile in relation to the fixed element.

BACKGROUND

The device can comprise sensors, making it possible to determine the movement of the mobile elements. These sensors, such as, for example, position, speed or acceleration sensors, are secured to the mobile elements and have to transmit the measured information to the fixed element. Other types of sensors, allowing a particular physical quantity to be measured, can also equip the mobile elements. As an example, an articulated arm can bear an environment sensor (temperature, pressure, etc.). The movement of the arm allows particular zones of space to be reached.

All these sensors generally return the measured information to the fixed element of the device to be processed therein.

The solution most commonly employed for the transmission of information between a mobile sensor and a fixed element consists in connecting the sensor by means of electric cables. The electrical cables run along link elements linking the fixed element to the mobile element bearing the sensor. The cables have to pass through the articulations linking the different elements to one another.

These cables risk being damaged when using the device, for example by catching on an external object. Furthermore, the cables often convey electrical signals of low intensity, likely to be disturbed by the electromagnetic environment. For example, the sensors of piezoelectric type deliver particularly low signals. The cables associated with these sensors cannot be of great length without degrading the information from the sensor.

In the particular case of a cylinder in which a stem is moved in translation in relation to a body of the cylinder, it is common practice to arrange, on the stem, a sensor allowing the position of the stem to be determined in relation to the body. The sensor is connected by a cable to the body of the cylinder. The conventional cylinders have symmetry of revolution and the stem remains free in rotation about the axis of translation of the cylinder. This freedom in rotation can be detrimental to the cable which risks being wound around the stem. There is then a need to provide a stem rotation prevention device, which pointlessly complicates the cylinder.

It has also been considered to provide a wireless link, for example by radio, between the sensor and the fixed element. This type of link is suitable for the data from the sensor, but remains subject to electromagnetic interference. Furthermore, the supply of energy to the sensor is not assured. It is then necessary to provide a battery secured to the sensor to power it. This battery needs to have a sufficient life to ensure the operation of the sensor and the transmission of information to the fixed element. It is also necessary to periodically provide for the recharging of the battery or the replacement thereof, which results in an increase in the cost of operation of the device.

SUMMARY OF THE INVENTION

The invention aims to mitigate all or some of the problems cited above by proposing a device having at least one sensor linked wirelessly both for the transmission of information and for the power supply thereof.

To this end, the subject of the invention is a device comprising a fixed element, a mobile element, a physical measurement sensor secured to the mobile element and a link allowing a transmission of information between the sensor and the fixed element, the sensor generating a primary signal representative of the physical measurement. According to the invention, the device further comprises a converter of the primary signal into a light signal. The converter is secured to the mobile element. The link is an optical path. The light signal is propagated freely between the fixed element and the mobile element along the optical path. The sensor comprises a power supply module receiving energy from the fixed element without contact.

The use of a free propagation mode over all of the optical path makes it possible to dispense with any wiring of electrical conductors or optical fibers.

Advantageously, the optical path is entirely situated within an opaque skin of the device.

The link can be configured to allow a one-way or two-way transmission of information between the sensor and the fixed element.

The sensor can comprise a photovoltaic cell linked to the power supply module. The device can comprise a light emitter secured to the fixed element and arranged so as to emit light toward the photovoltaic cell according to a free propagation. The energy received by the photovoltaic cell is transmitted to the power supply module in order to power the sensor. Here again, the free propagation mode makes it possible to dispense with any wiring.

Advantageously, the transmission of electrical energy between the light emitter and the photovoltaic cell uses the optical path.

Alternatively, the sensor can comprise an armature winding linked to the power supply module. The device can comprise a field winding secured to the fixed element. In a particular position of the fixed element and of the mobile element, the field and armature windings are sufficiently close to one another to exchange a sufficient quantity of energy to power the sensor.

In this particular variant of the invention, the device comprises a cylinder. The fixed element forms a body of the cylinder and the mobile element forms a stem of the cylinder. The optical path is arranged in the stem of the cylinder.

In a particular variant and the case of a power supply by induction, the particular position is one of the extreme positions of the cylinder.

BRIEF DESCRIPTION OF THE DRAWINGS

The invention will be better understood and other advantages will become apparent on reading the detailed description of an embodiment given by way of example, the description being illustrated by the attached drawing in which:

FIGS. 2a and 2b schematically represent an optical path implemented in the device of FIG. 1.

FIGS. 3a and 3b represent a particular application of the invention to a linear cylinder.

DETAILED DESCRIPTION

Figure 1:
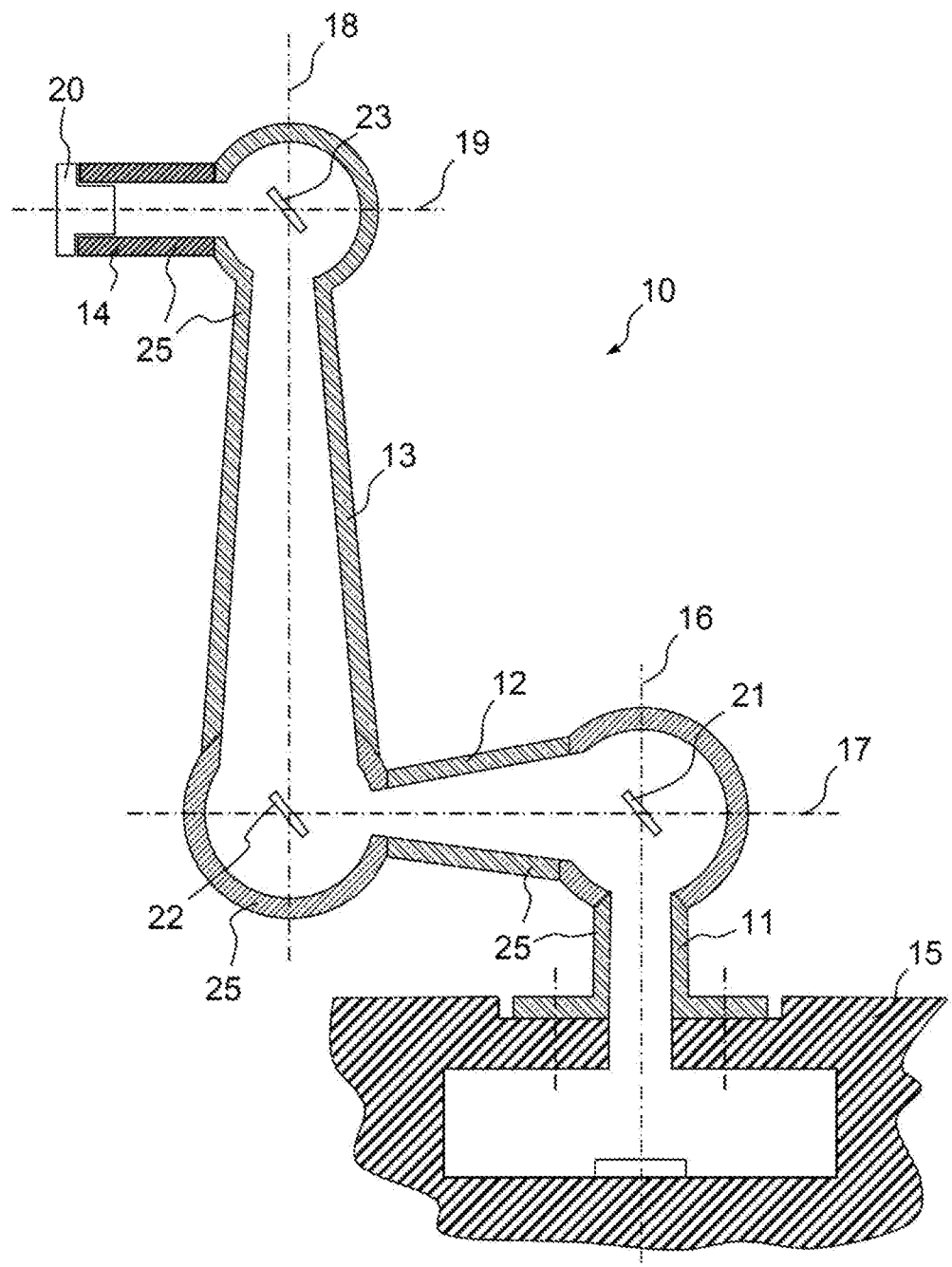
FIG. 1 represents a device according to the invention.

For clarity, the same elements will bear the same references in the different figures.

FIG. 1 represents, in partial cross section, a device such as, for example, a robotized arm 10. The arm 10 comprises several mutually articulated segments 11, 12, 13 and 14. The segment 11 is secured to a support 15 of the arm 10. The support is considered as a fixed element. The segment 11 extends mainly along an axis 16. The arm 12 extends along an axis 17. The arm 12 is rotationally mobile in relation to the segment 11 about the axis 17. Likewise, the segment 13 extends about an axis 18 and is rotationally mobile about the axis 18 in relation to the segment 12. Finally, the segment 14 extends about an axis 19 and is rotationally mobile about the axis 19 in relation to the segment 13. A sensor 20 is fixed to the segment 14. The structure of the arm 10 is given purely by way of example. The various rotations are motorized and the various actuators allowing these rotations are not represented to keep the figure uncluttered. Likewise, the arm 10 can fulfil functions other than that of bearing the sensor 20, such as, for example, a mechanical function of gripping objects, by means of a clamp fixed to the segment 14.

The invention can be implemented regardless of the number of segments and regardless of the type of articulation. It is possible to provide rotational movements and/or translational movements.

The sensor 20 allows a physical quantity to be measured, such as the temperature or pressure for example, at the end of the segment 14, the movement, the speed or the acceleration of the end of the segment 20. More generally, the invention can be implemented for any type of physical measurement.

The sensor 20 sends a signal representative of the physical measurement that it performs. In order to dispense with wiring between the segment 14 and the support 15, the signal is transmitted optically between the sensor 20 and the support 15 by using a free propagation mode, that is to say not guided as in an optical fiber. To this end, the arm 10 is configured to provide an unguided optical path between the sensor 20 and the support 15. In the example represented, the optical path follows the axes 19, 18, 17 and 16. At each articulation, the optical path comprises a mirror making it possible to produce an angled transmission of the optical path. More specifically, a mirror 21 modifies the direction of the optical path between the axis 16 and the axis 17, a mirror 22 modifies the direction of the optical path between the axis 17 and the axis 18 and a mirror 23 modifies the direction of the optical path between the axis 18 and the axis 19. It is of course understood that the number of mirrors depends on the number of articulations and on their respective degrees of freedom. For a translational movement, no mirror is a priori necessary.

Advantageously, the optical path used for the transmission of the signal between the sensor 20 and the support 15 is entirely situated within the arm 10. In other words, the arm 10 comprises an opaque skin 25 and the optical path is entirely situated within the skin 25. That allows the light radiation used for the transmission of the signal to be insulated from stray lights originating from the environment outside the arm 10.

FIGS. 2a and 2b schematically represent the optical path implemented in the arm 10. To simplify, the mirrors are not represented. FIG. 2a represents the sensor 20 at right angles to the optical path and FIG. 2b represents the sensor 20 and the support 15 in profile. The optical path is contained in the plane of FIG. 2b.

The sensor 20 comprises a cell 31 sensitive to the physical quantity to be measured. It can be, for example, a thermocouple for a temperature measurement, a piezoelectric cell for a pressure or force measurement, an accelerometer, etc. To ensure the transmission of the signal representative of the physical quantity between the sensor 20 and the support 15, the sensor 20 comprises a signal processing module 32 and a light emitter 33. The module 32 is connected to the cell 31 and to the emitter 33. The module 32 and the emitter 33 form a converter of the signal, called primary signal, from the cell 31 into a light signal. The cell 31, the module 32 and the emitter 33 are fixed to one another. In other words, upon movements of the arm 10, the various components of the sensor 20 are immobile in relation to one another. The primary signal can be an analog electrical signal and the light signal can modulate the intensity of the light emitted by the emitter 33, also in an analog way or in a digital way.

The support 15 comprises a receiver 35 arranged on the optical path so as to receive the light signal from the emitter 33. A processing of the light signal received by the receiver 35 is provided in the support 15. To keep the figure uncluttered, this processing is not represented.

The transmission of the light signal between the sensor 20 and the support 15 can be one-way, from the emitter 33 to the receiver 35. It is also possible to provide a two-way transmission, for example in order to calibrate the sensor 20 or to check the correct operation thereof. To this end, the support 15 comprises a light emitter 37 and the sensor 20 comprises a light receiver 38. The emitter 37 and the receiver 38 are also arranged on the optical path linking the sensor 20 and the support 15.

To supply the sensor 20 with energy, it is possible to transmit energy without contact from the support 15 to the sensor 20, for example in the form of a light beam. To this end, the support 15 comprises a light emitter 40 and the sensor 20 comprises a photovoltaic cell 41 linked to a power supply module 42 of the sensor 20. The emitter 40 and the photovoltaic cell 41 are advantageously situated on the same optical path which is used for the transmission of signals. The transmission of energy between the support 15 and the sensor 20 uses a free propagation mode over all of the optical path as for the transmission of information. The presence of any mirrors like those used for the transmission or transmissions of signals is exploited. Alternatively, to power the sensor 20, it is possible to use a second optical path distinct from the path used for the transmission of the signals. The light emitter 40 can comprise one or more power light-emitting diodes surrounding the receiver 35 and the emitter 37. It is also possible to use one and the same light-emitting diode to ensure the functions of both emitters 37 and 40. The light power needed to power the sensor 20 is transmitted by means of an average light intensity and the signal by means of a modulation of this intensity around the average intensity.

On the sensor 20 side, the photovoltaic cell 41 is for example of circular form. The emitter 33 and the receiver 38 are for example situated at the center of the photovoltaic cell 41.

The power supply module 42 receives the energy from the photovoltaic cell 41 and powers the cell 31 sensitive to the physical quantity to be measured and the signal processing module 32. It is possible to continuously power the sensor 20 when it is in operation by means of energy transmitted in light form. The continuous power supply makes it possible to dispense with any energy storage means in the sensor 20.

In FIGS. 3a and 3b, the invention is implemented in a linear cylinder 50 comprising a body 51 considered as fixed and a stem 52 that is translationally mobile in relation to the body 51 along an axis 53. The movement of the cylinder 50 is ensured conventionally by the pressure of a fluid in a chamber 54 if the cylinder is single-acting or in two chambers 54 and 55 if the cylinder is dual-acting. A sensor 20 is arranged at the end of the stem 52. FIG. 3a represents the cylinder 50 in a position where the stem 52 is retracted to the maximum and FIG. 3b, the cylinder 50 in a position where the stem 52 is extended to the maximum.

The stem 52 is hollow along the axis 53 and the optical path allowing the transmission of the signal or signals optically is situated inside the stem 52, which protects the optical path from the outside environment, as previously by means of the skin 25. The body 51 comprises a finger 56 extending along the axis 53 and penetrating into the interior space 57 of the stem 56. The receiver 35 and the emitter 37 are arranged at the end of the finger 56 to be optically visible to the emitter 33 and the receiver 38 belonging to the sensor 20.

The supply of energy to the sensor 20 can be produced in the same way as for the arm 10 by means of an emitter 40 fixed to the stem 56 and of a photovoltaic cell 41 fixed to the sensor 20 by implementing a free propagation mode between the emitter 40 and the photovoltaic cell 41.

Alternatively, it is possible to power the sensor 20 by induction when the stem 52 is in one of its extreme positions, for example in the position of FIG. 3a. To this end, the finger 56 comprises a field winding 60 and the sensor 20 comprises an armature winding 61. In the retracted position of the stem 52, (FIG. 3a), the windings 60 and 61 are situated in an immediate vicinity so as to be able to exchange a sufficient energy to power the sensor 20. It is possible to consider that the transmission of energy between the two windings 60 and 61 uses a free propagation mode. This propagation takes place in air with no ferromagnetic guiding element between the two windings 60 and 61. It is of course possible to provide a ferromagnetic element in each winding 60 and 61 but not between them.

The field winding 60 is supplied with alternating high current, for example at a frequency of the order of 20 to 100 kHz. This current generates another current in the armature winding 61. The power supply module 42 of the sensor 20 receives this induced current to adapt the energy that it transports in order to power the different components of the sensor 20. To ensure the operation of the sensor 20 when the stem 52 is away from the retracted position, the power supply module 42 comprises a temporary energy storage means, such as a battery or a capacitor for example.

It is also possible to arrange the windings 60 and 61 such that they exchange a substantial energy when the stem 52 is extended from the cylinder, in the position of FIG. 3b. The choice of the position of the cylinder 50 in which the windings 60 and 61 are closest together is made as a function of the use of the cylinder, and in particular the most common position of the stem 52.

The invention claimed is:

1. A device, comprising:
   a fixed element,
   a mobile element,
   a physical measurement sensor secured to the mobile element,
   a link allowing a transmission of information between the sensor and the fixed element, the sensor generating a primary signal representative of the physical measurement,
   an actuator configured to move the mobile element relative to the fixed element, and
   a converter for conversion of the primary signal into a light signal, the converter being secured to the mobile element,
   wherein the link is an optical path, the light signal being propagated freely between the fixed element and the mobile element along the optical path, and
   wherein the sensor comprises a power supply module receiving energy from the fixed element without contact.

2. The device as claimed in claim 1, wherein the optical path is entirely situated within an opaque skin of the device.

3. The device as claimed in claim 1, wherein the link is configured to allow a two-way transmission of information between the sensor and the fixed element.

4. The device as claimed in claim 1, wherein the sensor comprises a photovoltaic cell linked to the power supply module and
   wherein the device comprises a light emitter secured to the fixed element and arranged so as to emit light toward the photovoltaic cell according to a free propagation.

5. The device as claimed in claim 4, wherein the transmission of electrical energy between the light emitter and the photovoltaic cell uses the optical path.

6. The device as claimed in claim 1, wherein the sensor comprises an armature winding linked to the power supply module,
   wherein the device comprises a field winding secured to the fixed element, and
   wherein, in a particular position of the fixed element and of the mobile element, the field and armature windings are sufficiently close to one another to exchange a sufficient quantity of energy to power the sensor.

7. The device as claimed in claim 1, comprising a cylinder, wherein the fixed element forms a body of the cylinder,
   wherein the mobile element forms a stem of the cylinder and
   wherein the optical path is arranged in the stem of the cylinder.

8. The device as claimed in claim 6, wherein the particular position is an extreme position of a cylinder of the device.

9. The device as claimed in claim 1, comprising one or more mirrors configured to direct the light signal through the optical path.

10. The device as claimed in claim 6, wherein the particular position is an extreme position of the mobile element.

* * * * *